United States Patent [19]

Tanaka et al.

[11] 4,422,734
[45] Dec. 27, 1983

[54] PHOTOGRAPHIC LENS SYSTEM HAVING AN AUXILIARY LENS

[75] Inventors: Kazuo Tanaka, Tokyo; Keiji Ikemori, Yokohama, both of Japan

[73] Assignee: Canon Kabushiki Kaisha

[21] Appl. No.: 219,977

[22] Filed: Dec. 24, 1980

[30] Foreign Application Priority Data

Dec. 28, 1979 [JP] Japan .................. 54-171341

[51] Int. Cl.³ ............ G02B 9/62; G02B 9/64; G02B 15/10
[52] U.S. Cl. ........................... 350/422; 350/254
[58] Field of Search ........................ 350/422, 254

[56] References Cited

U.S. PATENT DOCUMENTS 3,388,650  6/1968  Westphalen ............... 350/422

Primary Examiner—John K. Corbin
Assistant Examiner—Rebecca D. Gass
Attorney, Agent, or Firm—Toren, McGeady and Stanger

[57] ABSTRACT

Disclosed is a lens system having a principal lens, a photographic film and an auxiliary lens which can be mounted between the principal lens and the photographic lens and has a negative refractive power. The auxiliary lens consisting of a first positive lens having a front surface with large radius and a convex rear surface at the image side, a second bi-concave lens and a third positive lens having a convex front surface at the object side and a rear surface with large radius in sequence from the object side, while the axial distance between the first positive lens and the second bi-concave lens is larger than that between the second bi-concave lens and the third positive lens and the second bi-concave lens and the third positive lens have a negative composed refraction power.

8 Claims, 20 Drawing Figures

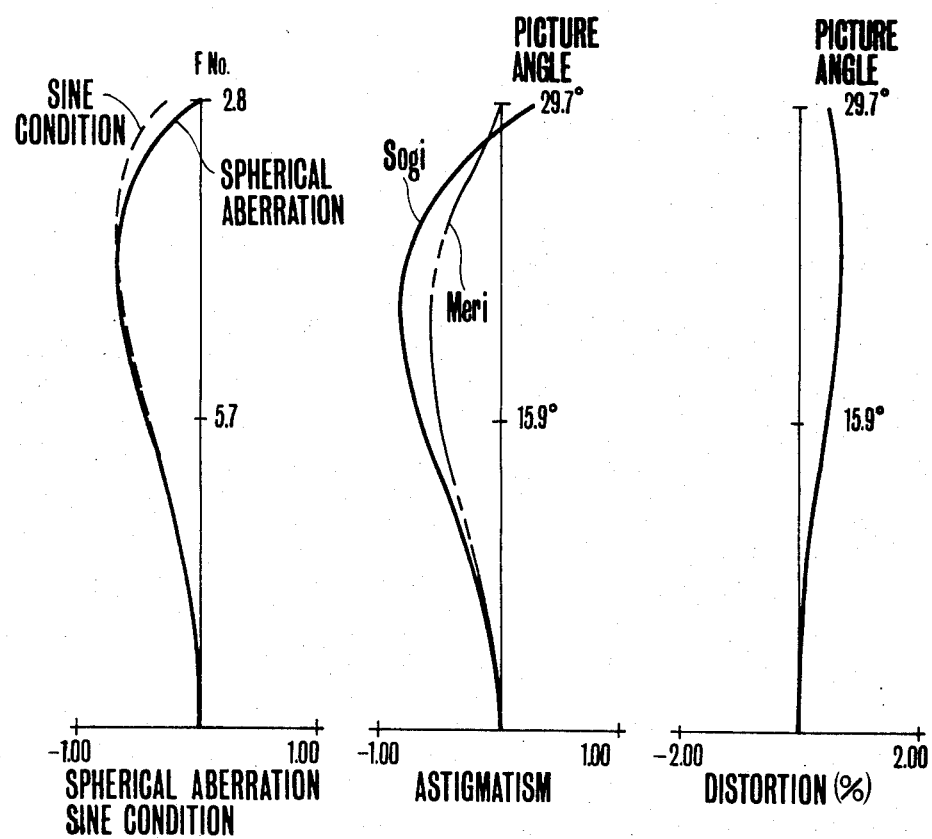

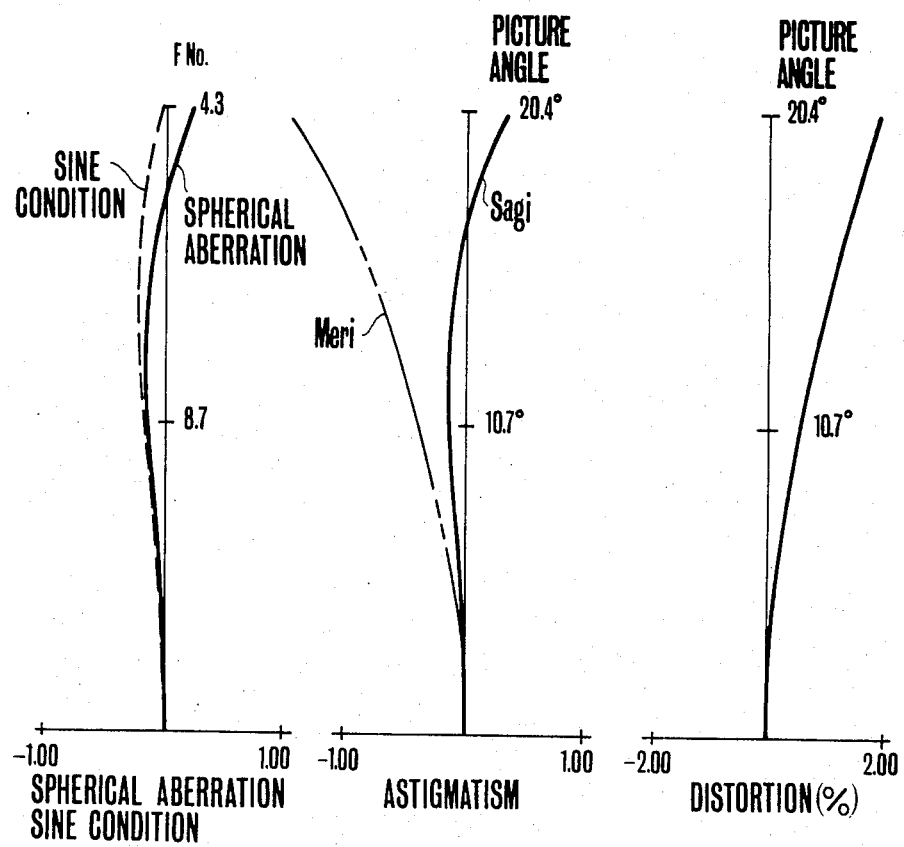

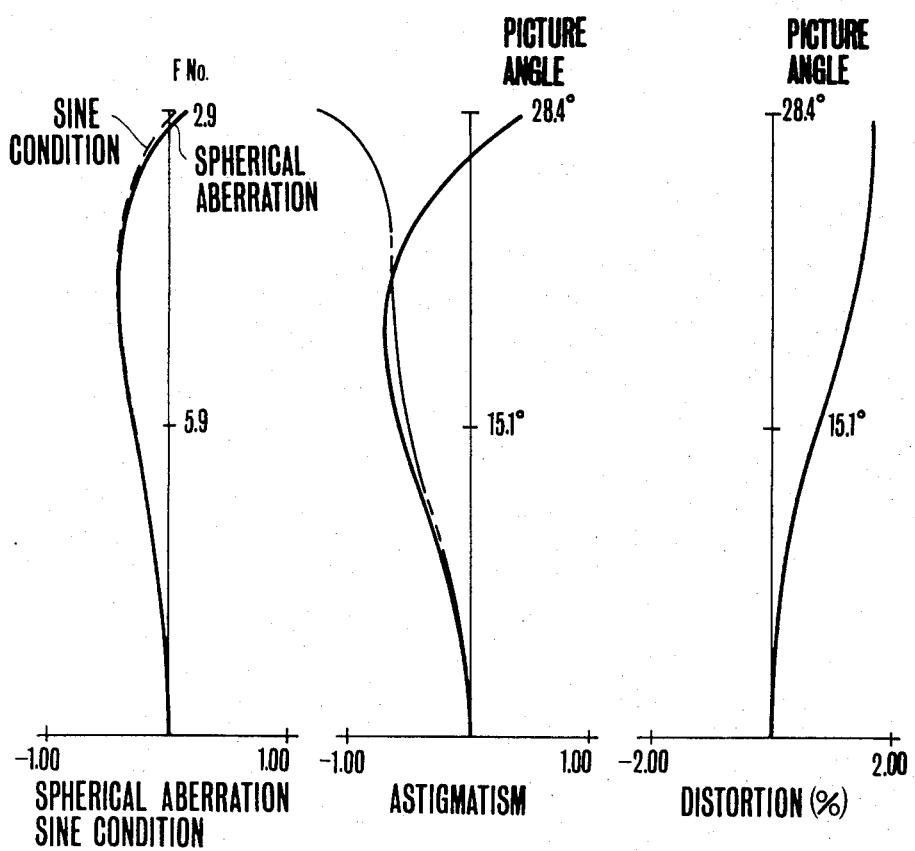

PHOTOGRAPHIC LENS SYSTEM HAVING AN AUXILIARY LENS

BACKGROUND OF THE INVENTION

The present invention relates to an attachment or a conversion lens, particularly a lens to be mounted between the principal lens and the image plane in such a manner that the optical axis coincide with each other, in order to increase the focal length of the principal lens.

Until now, it is widely known to mount a conversion lens at the object side or the image side of the photographing lens so as to increase or decrease the focal length while the image plane of the photographing lens is kept constant. Hereby, in the case of the front conversion lens mounted at the object side of the photographing lens, the size of the conversion lens, particularly the diameter of the front lens, is very large and cannot be made small. On the other hand, there is a possibility to realize a small rear conversion lens which is mounted at the image side of the photographing lens.

The rear conversion lens known until now are used for the so-called interchangeable lens camera. There are disclosed for example in Japanese Patent Application Laid-Open Nos. Sho 54-63752, Sho 54-25820, Sho 54-834 and Sho 54-53528. Further, the technique in accordance with which the rear conversion lens is built in the camera body so as to make the whole system compact is disclosed in Japanese Patent Application Laid-Open No. Sho 54-97423. However, the rear conversion lens for the interchangeable lens camera consists of 5 to 7 lenses and, thus, there are problems in the size and the cost. Further, the conversion lens which is built in the camera body consists of 6 lenses, and the size can be compared to that of the principal lens, which cannot be said to be compact.

SUMMARY OF THE INVENTION

An object of the present invention is to decrease the total length of the auxiliary lens to be mounted between the principal lens and the image plane.

Another object of the present invention is to offer an auxiliary lens consisting of a small number of lenses.

A further object of the present invention is to maintain the image quality in spite of decreasing the number of the lenses.

In the case of the lens system in accordance with the present invention, by constituting the above-mentioned rear conversion lens with the first positive lens, the second negative lens and the third positive lens in sequence from the object side, a high efficiency lens can be obtained in spite of as few as three lenses.

BRIEF DESCRIPTION OF THE DRAWINGS

FIGS. 2A-2C show the aberrations of the principal lens in FIG. 1 at the infinite distance.

FIGS. 4A-4C show the aberrations of the principal lens with the first example of the conversion lens at the infinite distance.

FIGS. 8A-8C show the aberrations of the principal lens in FIG. 7 at the infinite distance.

DESCRIPTION OF PREFERRED EMBODIMENTS

Figure 1:
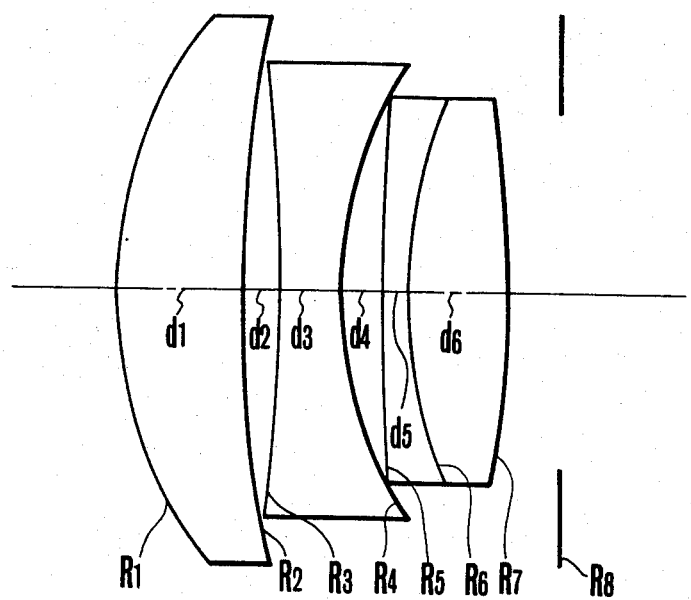
FIG. 1 shows a principal lens in section.
Figure 3:
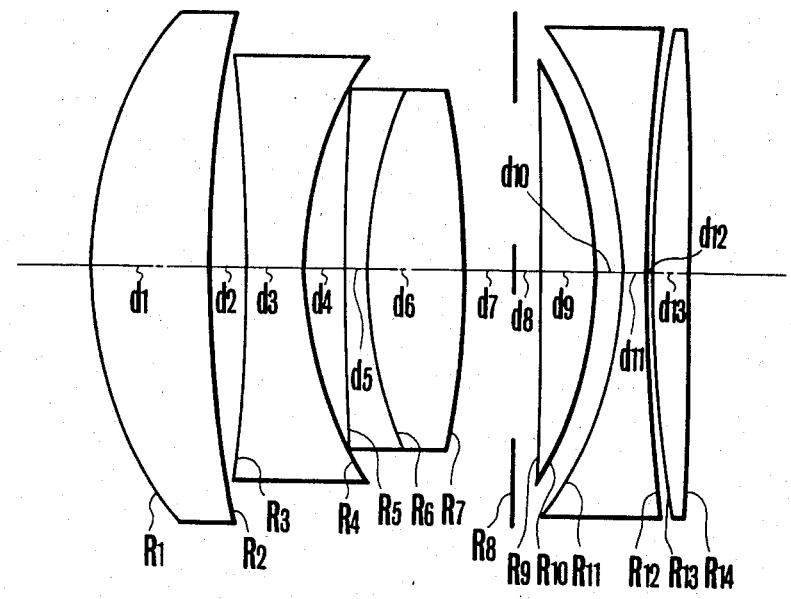
FIG. 3 shows the principal lens with the first example of the conversion lens in section.
Figure 5:
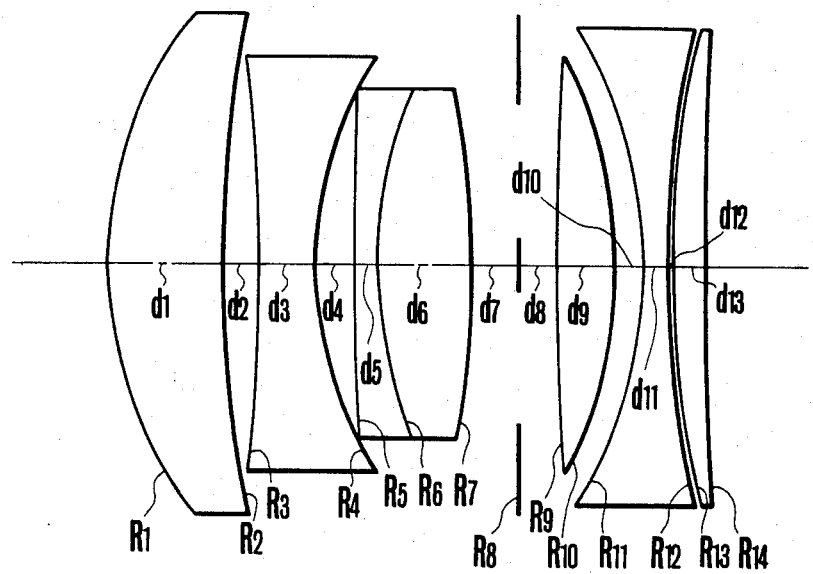
FIG. 5 shows the principal lens with the second example of the conversion lens in section.
Figure 7:
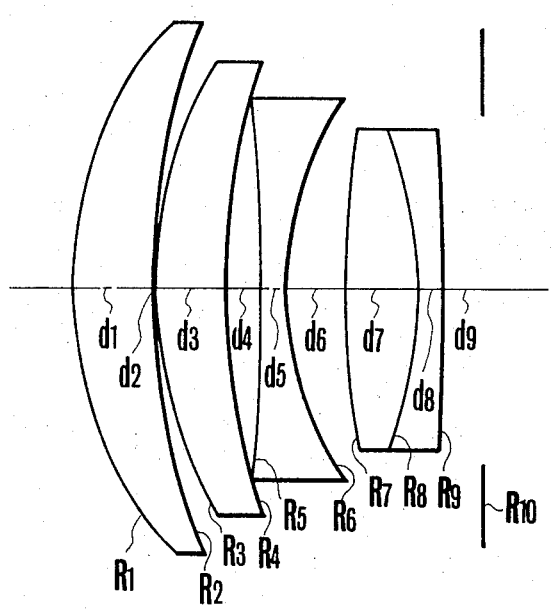
FIG. 7 shows another principal lens in section.
Figure 9:
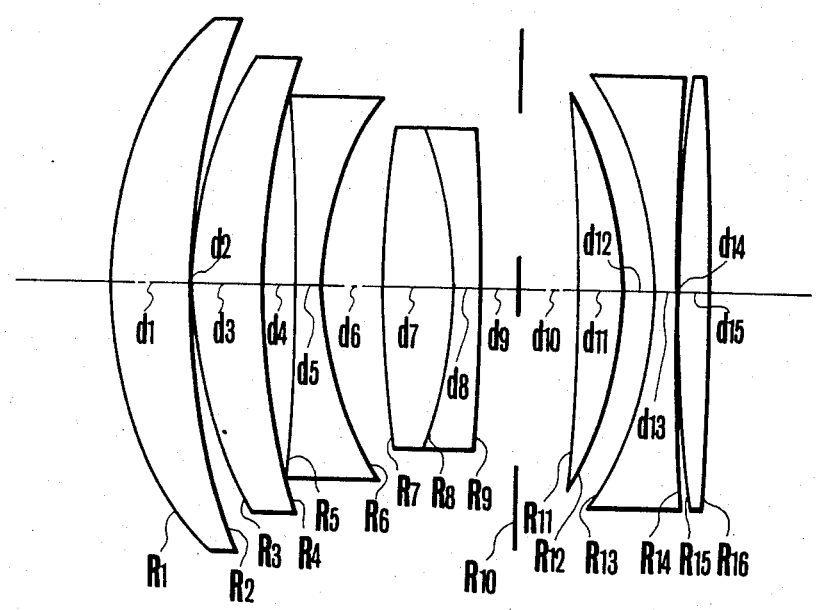
FIG. 9 shows the principal lens with the third example of the conversion lens in section.

FIGS. 1 and 7 respectively show an example of the principal lens. FIGS. 3, 5 and 9 respectively show the principal lens and the conversion lens mounted at the image side of the principal lens. The conversion lens itself has a negative power, whereby the thickness of the air-gap along the optical axis between the first positive lens and the second negative lens is larger than that of the air-gap along the optical axis between the second negative lens and the third positive lens. Further, the image side surface of the first positive lens is convex toward the image, while the object side surface of the second negative lens is concave toward the object. Further, the second negative lens is preferably a bi-concave one, while the object side surface of the above-mentioned third lens is preferably convex toward the object. Namely, the air-lens formed with the second negative lens and the third positive lens is preferably a meniscus one having a convex surface at the object side. The above air-lens is identical in shape with the meniscus air-lens formed with the first positive lens and the second negative lens, having a convex surface at the object side, whereby the only difference lies in the direction of the convex surface. These air-lenses cancel the aberrations caused with the respective air-lens well.

Further, the absolute radius of curvature of the object side surface of the first positive lens is larger than that of the image side surface. Consequently, the radius of curvature of the object side surface is so small that the surface is almost plane in such a manner that it is possible to make small the space of the camera body in which the converter lens is contained.

Below, the relation between the lens composition and the aberration correction will be explained.

Because the power of the rear conversion lens in accordance with the present invention is negative, the Petzval sum tends to be negative when the conversion lens is mounted so that the image field characteristics becomes inferior. In accordance with the present invention by making the distance between the first positive lens and the second negative lens larger than that between the second negative lens and the third positive lens the power of the first positive lens is made positive, while the compound power of the second negative lens and the third positive lens is made negative, in such a manner that although the whole system can be considered to consist of two groups, namely a positive lens at the object side and a negative lens at the image side it is possible to lower the power of each group. As a result, the negative Petzval sum due to the second negative lens can be absorbed with the positive Petzval sum due to the first positive lens and the third positive lens in such a manner that the compound Petzval sum of the principal lens and the rear conversion can be kept positive or almost zero, whereby the superior field characteristics can be secured.

As to the astigmatism having a close connection with the field characteristics by making the image side surface of the first positive lens convex and the object side surface of the second negative lens concave, the astigmatism due to the both surfaces can be cancelled with each other.

Further, by making the second negative lens a bi-concave one and the object side surface of the third positive lens convex, the astigmatism can well be cancelled with the first meniscus shape air-lens formed between the first positive lens and the second negative lens and having a convex object side surface and the second meniscus shape air-lens formed between the second negative lens and the third positive lens and having a convex object side surface in such a manner that the astigmatism is small in value as the whole.

As to the spherical aberration representing the characteristics along the optical axis, not only the third but also the higher order of the spherical aberration is much produced on the image side surface of the first positive lens, whereby by making a negative spherical aberration, whose absolute value is almost equal to the above positive spherical aberration, produced on the object side surface of the second negative lens a small spherical aberration can be secured as the whole. This is due to the fact that the image side surface of the first positive lens is convex, while the object side surface of the second negative lens is concave and that the distance between the first and the second lens is larger than that between the second negative lens and the third positive lens. Consequently, the spherical aberrations due to other surfaces than the above both surfaces are very small.

Further, the coma is produced on the image side surface of the first positive lens in the same way as in the case of the spherical aberration. Not only the lower order but also the higher order of negative comas are well cancelled by making a positive coma, whose absolute value is almost equal to the above negative coma, on the object side surface of the second negative lens.

Hereby, the distortion is corrected in the above airlens. Namely, the correction is carried out by means of the image side surface of the first positive lens and the object side surface of the second negative lens and by means of the image side surface of the second negative lens and the object side surface of the third positive lens. Consequently, the small distortion produced on the object side surface of the first positive lens and that produced on the image side surface of the third positive lens are the distortion as the whole.

Further, in the case of the present invention, the object side surface of the above first positive lens is convex or concave. However, the absolute radius of curvature of the object side surface of the first positive lens is smaller than that of the image side surface. Consequently, the curvature of the object side surface of the first positive lens is small and, therefore, the spherical aberration and the coma produced on this surface is small.

Further, in the case of the embodiments to be explained later, the aberration produced on the object side surface of the first positive lens and that produced on the object side surface of the third positive lens are different in sign and, thus, well cancelled with each other. Thus, the distortion, the astigmatism and other aberrations can well be compensated.

Below, the embodiments of the present invention will be explained. Hereby, in the case of the first and the second embodiments, the numbers of surfaces 1-7 constitute the principal lens, 8 the aperture and 9-14 the rear conversion lens. Hereby, it is possible to cement the second negative lens and the third positive lens with each other, by making the radius of curvature of the 12th surface equal to that of the 13th surface.

Further, in the case of the third embodiment, the surfaces 1-9 constitute the principal lens, the surface 10, the aperture and the surfaces 11-16, the rear conversion lens. Ri is the radius of curvature of the i-th surface, di the distance between the i-th and the i+1-th surface, $\nu d$ the Abbe's number and Ni the refraction index of the i-th lens with reference to d-line.

Further, in all the embodiments, the focal length of the principal lens to which the rear converter lens is mounted is 100.

| Surface No. | R | d | $\nu d$ | N | First Embodiment: |
|---|---|---|---|---|---|
| 1 | 34.595 | 10.717 | 49.60 | 1.77250 | |
| 2 | 109.667 | 3.089 | | 1. | |
| 3 | −158.806 | 5.266 | 29.20 | 1.72151 | Principal |
| 4 | 32.754 | 3.555 | | 1. | lens |
| 5 | 260.171 | 2.054 | 40.70 | 1.58144 | |
| 6 | 38.414 | 8.584 | 40.90 | 1.80610 | |
| 7 | −77.985 | 4.213 | | 1. | |
| 8 | 0.0 | 2.527 | | 1. | } Aperture |
| 9 | −568.043 | 4.763 | 70.10 | 1.48749 | |
| 10 | −35.768 | 2.517 | | 1. | |
| 11 | −35.000 | 2.315 | 49.60 | 1.77250 | Rear |
| 12 | 180.845 | 0.471 | | 1. | conversion |
| 13 | 128.207 | 3.092 | 25.40 | 1.80518 | lens |
| 14 | −689.586 | 94.756 | | 1. | |

FIG. 1 shows the principal lens of the first embodiment in section. FIG. 2 shows the aberrations (the spherical aberration, the sine condition, the astigmatism, the distortion) of only the principal lens. Further, FIG. 3 shows the principal lens and the rear conversion lens mounted on the principal lens in section. FIG. 4 shows the aberrations in this case. Hereby, when the rear conversion lens is mounted, the principal lens is moved toward the principal lens in such a manner that the image forming plane coincides with the in case of only the principal lens. Further, the focal length of the whole system when the rear conversion lens is mounted is 151.4. Below the aberrations at each surface when the rear conversion lens is mounted in the first embodiment are given.

| Surface No. | Spherical aberration | Coma | Astigmatism | Image plane distortion | Distortion |
|---|---|---|---|---|---|
| 1 | 20.6149 | −0.5721 | 0.0159 | 1.9075 | −0.0534 |
| 2 | 1.9111 | −2.1491 | 2.4167 | −0.6017 | −2.0409 |
| 3 | −15.5070 | 8.6908 | −4.8707 | −0.3996 | 2.9537 |
| 4 | −18.9614 | −2.8750 | −0.4359 | −1.9374 | −0.3599 |
| 5 | 0.5508 | 0.5413 | 0.5321 | 0.2140 | 0.7332 |
| 6 | 5.9107 | 0.8016 | 0.1087 | 0.3100 | 0.0568 |
| 7 | 10.4128 | −4.8386 | 2.2484 | 0.8666 | −1.4474 |
| 8 | 0.0 | 0.0 | 0.0 | 0.0 | 0.0 |
| 9 | −1.8279 | 1.4310 | −1.1203 | −0.0874 | 0.9454 |
| 10 | 50.5274 | −8.9770 | 1.5949 | 1.3873 | −0.5298 |
| 11 | −53.3473 | 8.8245 | −1.4597 | −1.8854 | 0.5533 |
| 12 | 0.0025 | 0.0160 | 0.1031 | −0.3649 | −1.6895 |
| 13 | −0.0016 | −0.0057 | −0.0201 | 0.5268 | 1.7798 |
| 14 | 0.5887 | −0.7279 | 0.9001 | 0.0979 | −1.2341 |
| Whole system | 0.8735 | 0.1599 | 0.0130 | 0.0337 | −0.3327 |

Second Embodiment:

| Surface No. | R | d | νd | N | |
|---|---|---|---|---|---|
| 1 | 34.595 | 10.717 | 49.60 | 1.77250 | Principal lens |
| 2 | 109.667 | 3.089 | | 1. | |
| 3 | −158.806 | 5.266 | 29.20 | 1.72151 | |
| 4 | 32.754 | 3.555 | | 1. | |
| 5 | 260.171 | 2.054 | 40.70 | 1.58144 | |
| 6 | 38.414 | 8.584 | 40.90 | 1.80610 | |
| 7 | −77.985 | 4.213 | | 1. | |
| 8 | 0.0 | 3.494 | | 1. | Aperture |
| 9 | 286.226 | 5.361 | 70.10 | 1.48749 | Rear conversion lens |
| 10 | −40.257 | 2.549 | | 1. | |
| 11 | −39.383 | 2.315 | 49.60 | 1.77250 | |
| 12 | 91.701 | 0.408 | | 1. | |
| 13 | 88.854 | 3.126 | 25.40 | 1.80518 | |
| 14 | 520.151 | 90.484 | | 1. | |

Figure 6A:
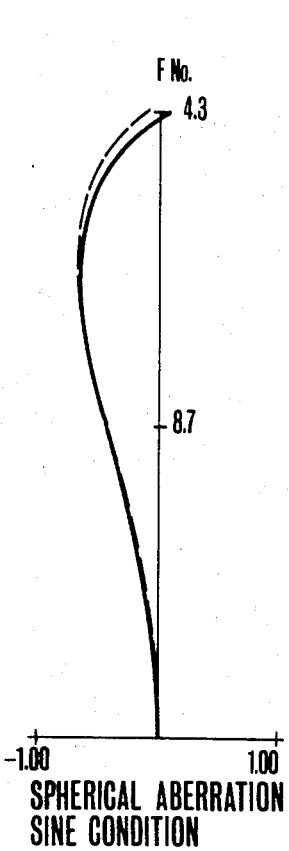
FIGS. 6A-6C show aberrations of the principal lens with the second example of the conversion lens at the infinite distance.
Figure 6B:
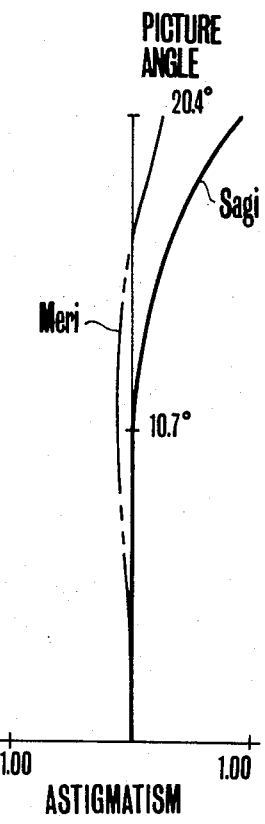
Figure 6C:
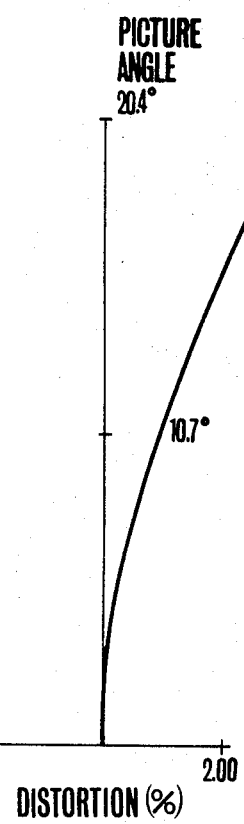

Because the principal lens of the second embodiment is identical with that of the first embodiment, FIG. 5 shows the principal lens with the rear conversion lens mounted on the principal lens in section, while FIG. 6 shows the aberrations. Further, the focal length of the whole system when the rear conversion lens is mounted on the second embodiment is 151.4.

Third Embodiment:

| Surface No. | R | d | νd | N | |
|---|---|---|---|---|---|
| 1 | 36.242 | 7.750 | 58.20 | 1.62299 | Principal lens |
| 2 | 67.482 | 0.250 | | 1. | |
| 3 | 40.812 | 6.750 | 53.20 | 1.69350 | |
| 4 | 67.275 | 3.060 | | 1. | |
| 5 | −183.915 | 2.500 | 33.80 | 1.64769 | |
| 6 | 30.195 | 5.750 | | 1. | |
| 7 | 91.520 | 6.750 | 49.60 | 1.77250 | |
| 8 | −38.475 | 2.500 | 48.90 | 1.53172 | |
| 9 | −221.272 | 3.625 | | 1. | |
| 10 | 0.0 | 5.622 | | 1. | Aperture |
| 11 | −171.932 | 4.300 | 70.10 | 1.48749 | Rear conversion lens |
| 12 | −35.030 | 3.020 | | 1. | |
| 13 | −34.990 | 2.197 | 49.60 | 1.77250 | |
| 14 | 334.562 | 0.230 | | 1. | |
| 15 | 174.477 | 2.813 | 25.40 | 1.80518 | |
| 16 | −367.497 | | | 1. | |

Figures 10A, 10B, 10C:
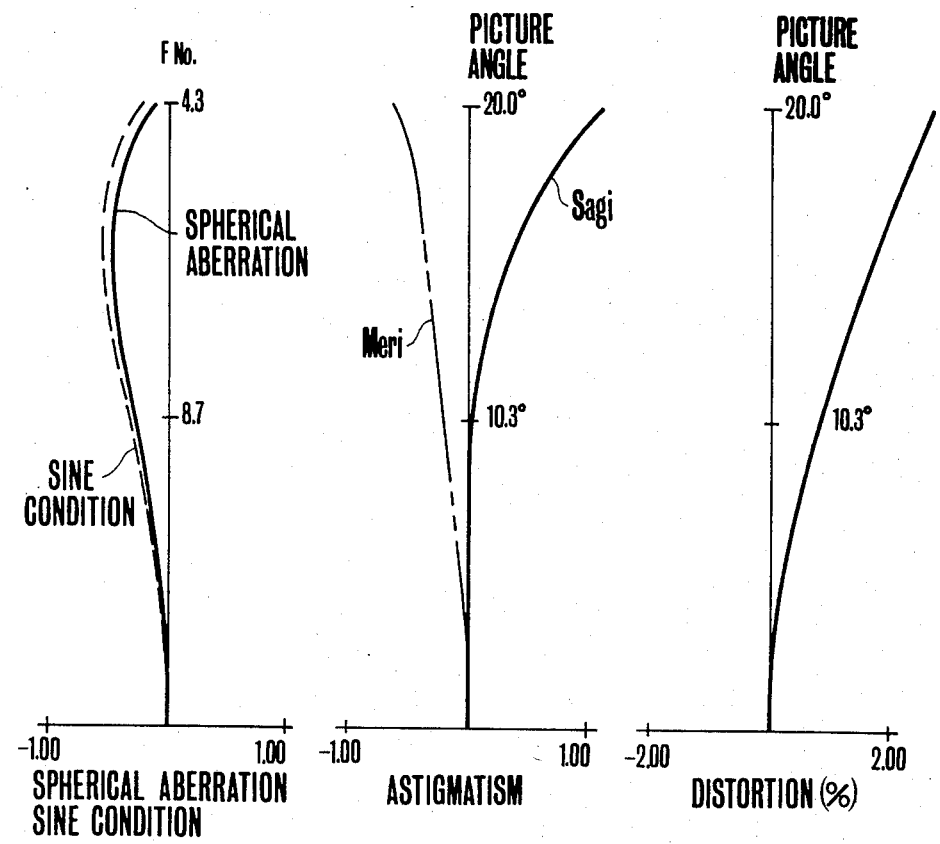
FIGS. 10A-10C show the aberrations of the principal lens with the third conversion lens at the infinite distance.

FIG. 7 shows the principal lens of the third embodiment in section. FIG. 8 shows the aberrations of the principal lens of the third embodiment. FIG. 9 shows the principal lens with the rear conversion lens mounted at the image side of the principal lens in section. FIG. 10 shows the aberrations. Hereby, when the rear conversion lens is mounted, the principal lens is moved toward the object side in the same way as in case of the above embodiment. The focal length of the whole lens system when the rear conversion lens is mounted is 148.8.

What is claimed is:

1. A photographic lens system comprising: a principal lens having an optical axis; and an auxiliary lens to be mounted at the image side of the principal lens in such a manner that the optical axis coincide with each other, said lens being capable of being dismounted, having a negative refractive power and consisting of the first positive lens, the second negative lens and the third positive lens in sequence from the object side; and wherein the compound refractive power of the second negative lens and the third positive lens is negative.

2. A photographic lens system in accordance with claim 1, wherein the image side surface of the first positive lens is convex toward the image, and the object side surface of the second negative lens is concave toward the object.

3. A photographic lens system in accordance with claim 2, wherein the radius of curvature of the object side surface of the first positive lens is larger than that of the image side surface.

4. A photographic lens system in accordance with claim 2, wherein the image side surface of the second negative lens is concave toward the image, and the radius of curvature of the image side surface is larger than that of the object side surface.

5. A photographic lens system in accordance with claim 1, the distance between the first positive lens and the second negative lens is larger than that between the second negative lens and the third positive lens.

6. A photograhic lens system in accordance with claim 1, in which said third positive lens has a convex surface on the object side, and the radius of curvature of the image side surface is larger than that of the object side surface.

7. A photographic lens system in accordance with claim 1, wherein the image side surface of the first positive lens is convex toward the image, thereby the radius of curvature of the object side surface is larger than that of the image side surface, the object side surface of the second negative lens is concave toward the object side, and the image side surface is concave toward the image, whereby the radius of curvature of the image side surface is larger than that of the object side and the object side surface of the third positive lens is convex toward the object, whereby the absolute value of radius of curvature of the image side surface is larger than that of the object side surface.

8. A photographic lens in accordance with claim 7, wherein the distance between the first positive lens and the second negative lens is larger than that between the second negative lens and the third positive lens.

* * * * *